(12) United States Patent
Warner

(10) Patent No.: US 8,127,918 B2
(45) Date of Patent: Mar. 6, 2012

(54) METHOD AND APPARATUS FOR MONITORING A CONVEYOR BELT

(75) Inventor: Graham Warner, Orange (AU)

(73) Assignee: Barge's Belting Solution Pty Ltd, Orange, NSW (AU)

( * ) Notice: Subject to any disclaimer, the term of this patent is extended or adjusted under 35 U.S.C. 154(b) by 76 days.

(21) Appl. No.: 12/864,173

(22) PCT Filed: Jan. 19, 2009

(86) PCT No.: PCT/AU2009/000058
§ 371 (c)(1),
(2), (4) Date: Jul. 22, 2010

(87) PCT Pub. No.: WO2009/092130
PCT Pub. Date: Jul. 30, 2009

(65) Prior Publication Data
US 2010/0294624 A1     Nov. 25, 2010

(30) Foreign Application Priority Data
Jan. 22, 2008  (AU) ................................ 2008900296

(51) Int. Cl.
*B65G 39/16*    (2006.01)
*B65G 43/02*    (2006.01)

(52) U.S. Cl. ............... 198/810.03; 198/810.02; 198/825; 198/840; 198/842

(58) Field of Classification Search .................. 198/806, 198/807, 808, 810.02, 810.03, 825, 826, 198/840, 842
See application file for complete search history.

(56) References Cited

U.S. PATENT DOCUMENTS

| | | | |
|---|---|---|---|
| 632,787 A | 9/1899 | Metcalf | |
| 1,446,270 A * | 2/1923 | Pfeiffer | 198/501 |
| 1,973,095 A * | 9/1934 | Muller | 198/499 |
| 2,880,851 A * | 4/1959 | Salmons | 198/825 |
| 3,240,321 A * | 3/1966 | Lo Presti et al. | 198/808 |
| 3,597,756 A | 8/1971 | Jackson | |
| 4,013,163 A | 3/1977 | Gaáal | |
| 4,032,002 A * | 6/1977 | Jackson | 198/808 |
| 4,228,513 A | 10/1980 | Doljack | |
| 4,274,783 A | 6/1981 | Eineichner et al. | |
| 4,296,855 A | 10/1981 | Blalock | |

(Continued)

FOREIGN PATENT DOCUMENTS

DE         2746882         4/1979

(Continued)

OTHER PUBLICATIONS

Hanjin D&B Co., Ltd., obtained by Applicant at MINExpo (http://www.minexpo.com/) in Las Vegas, Nevada between Sep. 22 to Sep. 24, 2008.

*Primary Examiner* — Mark A Deuble
(74) *Attorney, Agent, or Firm* — Kilpatrick Townsend & Stockton LLP

(57) ABSTRACT

A method and apparatus for monitoring operation of a conveyor belt. The apparatus includes a detection system configured to detect transverse displacement of each edge of a portion of the conveyor belt as the conveyor belt travels past the detection system, and determine, using the transverse displacements of the edges of the conveyor belt and one or more operating rules, if an operating irregularity of the conveyor belt has occurred.

26 Claims, 10 Drawing Sheets

U.S. PATENT DOCUMENTS

| | | |
|---|---|---|
| 4,349,883 A | 9/1982 | Doljack |
| 4,436,198 A | 3/1984 | Houck et al. |
| 4,447,807 A | 5/1984 | Klein et al. |
| 4,463,434 A | 7/1984 | Haylett et al. |
| 4,464,654 A | 8/1984 | Klein |
| 4,470,120 A | 9/1984 | Haylett |
| 4,541,063 A | 9/1985 | Doljack |
| 4,577,502 A | 3/1986 | Cunningham |
| 4,646,912 A | 3/1987 | Houck et al. |
| 4,653,633 A | 3/1987 | Jacobs |
| 4,854,446 A | 8/1989 | Strader |
| 4,914,964 A | 4/1990 | Speiser |
| 5,133,448 A | 7/1992 | Van Niekerk |
| 5,168,266 A | 12/1992 | Fukuda |
| 5,212,982 A | 5/1993 | Macchiarulo et al. |
| 5,215,422 A * | 6/1993 | Snead .................. 414/339 |
| 5,231,919 A | 8/1993 | Lawrence et al. |
| 5,337,885 A | 8/1994 | Mills et al. |
| 5,373,935 A * | 12/1994 | Anderson .............. 198/808 |
| 5,490,590 A | 2/1996 | Courtney |
| 5,563,392 A | 10/1996 | Brown et al. |
| 5,884,747 A | 3/1999 | Sandstedt et al. |
| 5,937,992 A | 8/1999 | Davis et al. |
| 5,979,635 A | 11/1999 | Calhoun |
| 5,994,712 A | 11/1999 | Mack |
| 6,011,818 A | 1/2000 | Yang |
| 6,032,787 A | 3/2000 | Kellis |
| 6,158,576 A | 12/2000 | Eagles et al. |
| 6,173,830 B1 * | 1/2001 | Cumberlege et al. ......... 198/842 |
| 6,241,070 B1 | 6/2001 | Loder |
| 6,241,078 B1 * | 6/2001 | Mott .................. 198/806 |
| 6,305,525 B1 | 10/2001 | Miller et al. |
| 6,336,684 B1 | 1/2002 | Turner |
| 6,446,788 B1 | 9/2002 | Leidy et al. |
| 6,452,149 B1 | 9/2002 | Yamashita et al. |
| 6,460,683 B1 | 10/2002 | Pfeiffer |
| 6,508,353 B1 | 1/2003 | Edström |
| 6,585,108 B2 | 7/2003 | Travis |
| 6,588,578 B1 | 7/2003 | Ernst |
| 6,601,688 B1 | 8/2003 | Stöxen |
| 6,612,423 B1 | 9/2003 | Silverman |
| 6,712,200 B2 | 3/2004 | Ubaldi |
| 6,715,601 B2 | 4/2004 | Abel et al. |
| 6,715,602 B1 | 4/2004 | Gartland |
| 6,729,463 B2 | 5/2004 | Pfeiffer |
| 6,781,515 B2 | 8/2004 | Kuzik et al. |
| 6,851,546 B2 | 2/2005 | Lodge |
| 6,852,050 B2 | 2/2005 | Sands et al. |
| 6,988,610 B2 | 1/2006 | Fromme et al. |
| 7,032,740 B2 | 4/2006 | Hochhaus et al. |
| 7,117,989 B2 | 10/2006 | Weigel et al. |
| 7,131,529 B2 * | 11/2006 | Meade .................. 198/810.03 |
| 7,133,742 B2 | 11/2006 | Cruysen et al. |
| 7,140,486 B2 | 11/2006 | Klm |
| 7,614,493 B2 * | 11/2009 | Dowling et al. .............. 198/806 |
| 2002/0027060 A1 | 3/2002 | Boller et al. |
| 2004/0245071 A1 | 12/2004 | Giffin |
| 2004/0262132 A1 | 12/2004 | Pauley et al. |
| 2005/0115060 A1 | 6/2005 | Kondo |
| 2006/0219528 A1 | 10/2006 | Aizawa et al. |
| 2007/0056379 A1 | 3/2007 | Nassar et al. |

FOREIGN PATENT DOCUMENTS

| | | |
|---|---|---|
| DE | 2854562 | 6/1980 |
| DE | 4111358 A1 | 10/1992 |
| DE | 10106206 | 8/2002 |
| JP | 58006811 | 1/1983 |
| JP | 04-159911 A | 6/1992 |

* cited by examiner

METHOD AND APPARATUS FOR MONITORING A CONVEYOR BELT

FIELD OF INVENTION

The present invention relates to a method and apparatus for monitoring the operation, such as the condition and/or tracking, of a conveyor belt.

BACKGROUND

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

A problem with conveyor belt systems is that they can be subject to rips or tears, poor tracking due to poor loading, and/or bearing failures of pulleys and idlers which in turn effects their operation and in particular, their ability to carry product. In industries such as mining, failure of a conveyor belt systems can have a large impact on the overall operation of the mine. It is therefore desirable to ensure that rips and poor tracking in conveyor belts are identified as rapidly as possible to minimise their impact. A number of belt rip detection systems have been proposed.

U.S. Pat. No. 6,032,787 describes a conveyor belt condition monitoring system having a signal emitter for emitting at least one detectable signal disposed on one side of a conveyor belt, a signal receiver for receiving the detectable signal disposed on the opposite side of the conveyor belt, and a controller for controlling the emission of the at least one detectable signal and for monitoring the extent of blockage and/or transmission of the detectable signal by the conveyor belt.

Similarly, U.S. Pat. No. 5,994,712 describes a belt flaw detector having a light source for exposing the surface of the conveyor belt to radiation and a sensor for detecting transmitted radiation to warn of a flaw in the belt.

Rip detection systems of this form therefore typically require detection to be performed over the entire belt surface, which can require extensive detection systems and lead to complex signal processing requirements.

U.S. Pat. No. 5,133,448 describes a method of detecting a tear in a conveyor belt by using pivotable arms biased against the sides of the belt. Each arm is connected to a variable resistor connected into an electronic circuit so that when there is a tear in the belt, the arm will pivot inwardly causing the resistance of its associated resistor to change. This change is processed by the circuit to generate a signal which may be used to interrupt electric power to an electric motor driving the belt.

In this instance however the belt can shift on the supporting rollers leading to false rip detection, which in turn can lead to unnecessary shutting down of the conveyor belt. Additionally, not all forms of rip are evident solely by detecting the belt edge position.

U.S. Pat. No. 4,447,807 describes a system using antennas embedded within a conveyor belt. Signals are applied to the antennas as they move past a rip detector station to detect rips in the conveyor belt.

Similarly, U.S. Pat. No. 4,646,912 describes a rip detector system having electrically conductive antennae imbedded in the conveyor and spaced along the direction of movement of the belt and extending from edge to edge of the belt for carrying signals thereacross.

It will be appreciated that rip detection systems of this form require antennas to be embedded within the conveyor belt, which leads to a corresponding increase conveyor belt cost. Furthermore, such systems will only detect a rip if it intercepts one of the antennae, which may not occur for example in the case of edge rips and longitudinal rips of a short length.

SUMMARY OF EMBODIMENTS

In one broad aspect there is provided an apparatus for monitoring operation of a conveyor belt, wherein the apparatus includes a detection system configured to:
  detect transverse displacement of each edge of a portion of the conveyor belt as the conveyor belt travels past the detection system; and
  determine, using the transverse displacements of the edges of the conveyor belt and one or more operating rules, if an operating irregularity of the conveyor belt has occurred.

In one form, the detection system uses the transverse displacements of the edges of the conveyor belt and the one or more operating rules to determine if an operating irregularity of the conveyor belt has occurred including at least one of:
  a rip in the conveyor belt;
  belt wander of the conveyor belt; and
  edge damage of the conveyor belt.

In another form, the detection system is configured to detect at least one of:
  a height of material upon the conveyor belt; and
  material upon a return belt path;
wherein detection of material is used with the one or more operating rules to determine if an operating irregularity has occurred.

In one embodiment, the apparatus includes rollers including angularly offset rollers supporting the conveyor belt, wherein the angularly offset rollers have an axis which are angularly offset relative to a transport direction of the conveyor belt for applying an outward transverse force toward opposing edges of the portion of the conveyor belt travelling past the detection system.

In another embodiment, at least some of the rollers have an inclined axis for thereby raising opposing edges across the width of the conveyor belt.

In an optional form, the rollers includes:
  a base roller having an axis substantially parallel with a substantially horizontal support surface;
  a first side roller having an axis which is inclined relative to the base roller for raising a corresponding first edge of the portion of the conveyor belt; and
  a second side roller having an axis which is inclined relative to the base roller and opposing inclined relative to the first side roller for raising a corresponding second and opposing edge of the portion of the conveyor belt.

In another optional form, the detection system includes:
  at least one sensor for sensing operation of the conveyor belt; and
  a processing system coupled to the at least one sensor for determining if an operating irregularity has occurred for the conveyor belt.

In an optional embodiment, the processing system is for:
  receiving an indication of the operation of the conveyor belt from the at least one sensor;
  using the one or more operating rules by comparing a variable to a threshold, the variable being at least partially based on the indication; and determining the presence, absence or degree of an operating irregularity in accordance with the results of the comparison.

In another optional embodiment, the variable is at least one of:
 the indication;
 indicative of the transverse displacement of the edges of the belt;
 indicative of a belt width;
 indicative of a height of material on the belt; and
 indicative of whether material is upon the return belt path.

Optionally, the processing system is for:
 determining a belt profile indicative of an acceptably operating belt;
 comparing the variable to the belt profile; and
 determining the presence, absence or degree of a operating irregularity in accordance with the results of the comparison.

In one form, the processing system is for determining the belt profile by monitoring the at least one sensor during a configuration phase.

In another form, the processing system is for determining the belt profile by:
 monitoring the at least one sensor to receive the indication of the transverse displacement of the belt edges; and
 using the indication to generate the belt profile.

In one embodiment, the processing system is for:
 monitoring the at least one sensor to determine a start point; and
 generating the belt profile in accordance with the start point.

In another embodiment, in response to determining an operating irregularity, the processing system is for at least one of:
 generating an alert; and
 stopping the conveyor belt.

In an optional form, the detection system includes at least two sensors being positioned adjacent the edges of the belt to thereby allow the transverse displacement of each belt edge to be determined, wherein the transverse displacement is indicative of a distance between a respective belt edge and a respective sensor.

In another optional form, the processing system uses the transverse displacement for each belt edge to determine a belt width.

In an optional embodiment, the detection system includes at least one ultrasonic sensor.

In another optional embodiment, the detection system includes at least one belt return path sensor for detecting material on a belt return path.

In one form, the detection system includes at least one material height sensor for detecting a height of the material upon the conveyor belt.

In another form, at least one of the belt return path sensor and the material height sensor is a laser sensor, wherein when the laser sensor senses if material breaks a laser path of the laser sensor.

In another broad aspect there is provided a method for monitoring operation of a conveyor belt, wherein the method includes, in a detection system, steps of
 detecting transverse displacement of each edge of a portion of the conveyor belt as the conveyor belt travels past the detection system; and
 determining, using the transverse displacements of the edges of the conveyor belt and one or more operating rules, if an operating irregularity of the conveyor belt has occurred.

In one form, the method includes, in the detection system, using the transverse displacements of the edges of the conveyor belt and the one or more operating rules to determine if an operating irregularity of the conveyor belt has occurred including at least one of:
 a rip in the conveyor belt;
 belt wander of the conveyor belt; and
 edge damage of the conveyor belt.

In another form, the method includes, in the detection system, detecting at least one of:
 a height of material upon the conveyor belt; and
 material upon a return belt path;
wherein detection of material is used with the one or more operating rules to determine if an operating irregularity has occurred.

In one embodiment, the method includes applying an outward transverse force toward opposing edges of the portion of the conveyor belt travelling past the detection system via rollers including angularly offset rollers supporting the conveyor belt, wherein the angularly offset rollers have an axis which are angularly offset relative to a transport direction of the conveyor belt.

In another embodiment, the method includes applying the outward transverse force via at least some of the rollers having an inclined axis, thereby raising opposing edges across the width of the conveyor belt.

In an optional form, the method includes providing rollers including:
 a base roller having an axis substantially parallel with a substantially horizontal support surface;
 a first side roller having an axis which is inclined relative to the base roller for raising a corresponding first edge of the portion of the conveyor belt; and
 a second side roller having an axis which is inclined relative to the base roller and opposing inclined relative to the first side roller for raising a corresponding second and opposing edge of the portion of the conveyor belt.

In another optional form, the method includes, in the detection system, steps of:
 sensing operation of the conveyor belt using at least one sensor; and
 determining, using a processing system coupled to the at least one sensor, if an operating irregularity has occurred for the conveyor belt.

In an optional embodiment, the method includes, in the processing system, steps of:
 receiving an indication of the operation of the conveyor belt from the at least one sensor;
 using the one or more operating rules by comparing a variable to a threshold, the variable being at least partially based on the indication; and
 determining the presence, absence or degree of an operating irregularity in accordance with the results of the comparison.

In another optional embodiment, the variable is at least one of:
 the indication;
 indicative of the transverse displacement of the edges of the belt;
 indicative of a belt width;
 indicative of a height of material on the belt; and
 indicative of whether material is upon the return belt path.

In one form, the method includes, in the processing system, steps of:
 determining a belt profile indicative of an acceptably operating belt;
 comparing the variable to the belt profile; and determining the presence, absence or degree of a operating irregularity in accordance with the results of the comparison.

In another form, the method includes, in the processing system, steps of determining the belt profile by monitoring the at least one sensor during a configuration phase.

In one embodiment, the method includes, in the processing system, determining the belt profile by:
monitoring the at least one sensor to receive the indication of the transverse displacement of the belt edges; and
using the indication to generate the belt profile.

In another embodiment, the method includes, in the processing system, steps of:
monitoring the at least one sensor to determine a start point; and
generating the belt profile in accordance with the start point.

In one optional form, in response to determining an operating irregularity, the method includes, in the processing system, at least one of:
generating an alert; and
stopping the conveyor belt.

In another optional form, the method includes, sensing, using at least two sensors positioned adjacent the edges of the belt, the transverse displacement of each belt edge, wherein the transverse displacement is indicative of a distance between a respective belt edge and a respective sensor.

In one optional embodiment, the method includes, in the processing system, using the transverse displacement for each belt edge to determine a belt width.

In another optional embodiment, the method includes using at least one ultrasonic sensor to detect the transverse displacement of the belt edges.

In one form, the method includes using at least one belt return path sensor for detecting material on a belt return path.

In another form, the method includes detecting a height of the material upon the conveyor belt using at least one material height sensor.

In one embodiment, the method includes using a laser sensor for at least one of the belt return path sensor and the material height sensor, wherein when the laser sensor senses if material breaks a laser path of the laser sensor.

BRIEF DESCRIPTION OF THE DRAWINGS

An example of the present invention will now be described with reference to the accompanying drawings, in which:—

DETAILED DESCRIPTION OF THE PREFERRED EMBODIMENTS

Figure 1A:
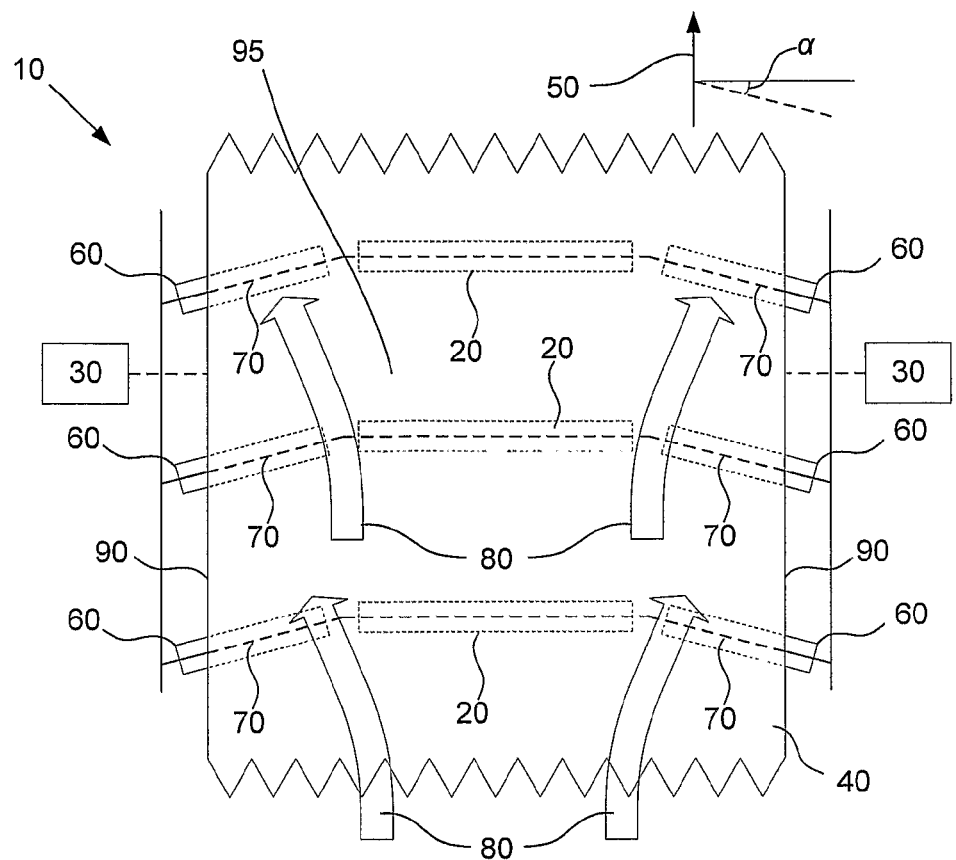
FIG. 1A shows a schematic plan view of an example of an apparatus for monitoring a conveyor belt.
Figure 1B:
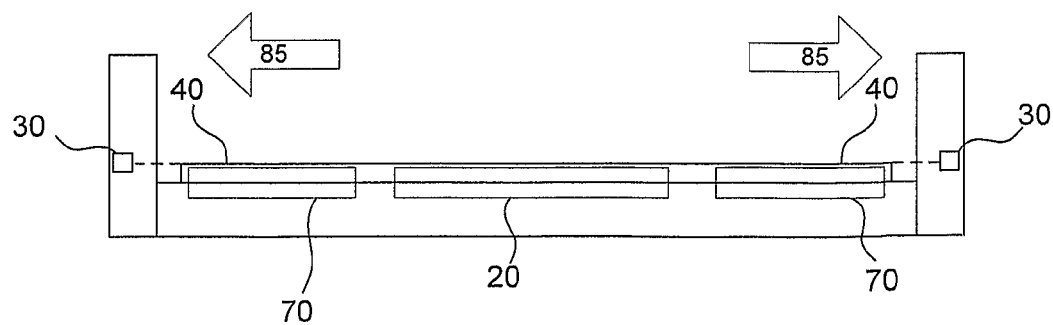
FIG. 1B shows a schematic end view of the apparatus of FIG. 1A.

Referring to FIGS. 1A and 1B there is provided an example of an apparatus 10 for monitoring operation of a conveyor belt 40. In particular, the apparatus 10 includes a detection system 30 configured to detect transverse displacement of each edge 90 of a portion of the conveyor belt 40 as the conveyor belt 40 travels past the detection system 30, and determine, using the transverse displacements of the edges 90 of the conveyor belt 40 and one or more operating rules, if an operating irregularity of the conveyor belt 40 has occurred.

As the detection system 30 monitors a portion of the belt as it passes by the detection system, the entire belt can be monitored whilst not necessarily requiring sensors or the like along the entire length of the belt.

Additionally, as the transverse displacement of both edges are detected and used in the determination, a plurality of operating irregularities can be identified, such as whether a belt rip has occurred, whether unacceptable belt wander is occurring, and/or whether one or both edges of the belt have been damaged.

Continuing to refer to FIGS. 1A and 1B, the apparatus 10 can include a plurality of rollers 20. It will be appreciated that FIG. 1A only illustrates a portion of the conveyor belt for clarity purposes only. The plurality of rollers 20 are configured to support the conveyor belt 40 moving in a transport direction as shown by arrow 50. The plurality of rollers 20 includes angularly offset rollers 60 having an axis 70 which is angularly offset relative to the transport direction 50, as represented by angle α, for applying an outward transverse force, as represented by arrow 80 in FIG. 1A and arrow 85 in FIG. 1B representing the transverse component of the force, toward opposing edges 90 of at least a portion 95 of the conveyor belt 40.

As an outward transverse force 80 is applied across the width of the portion of the conveyor belt 40, effects of damage, such as rips or other flaws, of the belt 40 are exacerbated thereby allowing the provision of a simple detection system to detect an operating irregularity in the belt 130.

An example of a section of a conveyor belt system modified to detect operating irregularities will now be described with reference to FIGS. 2A, 2B, 2C and 2D.

Figure 2A:
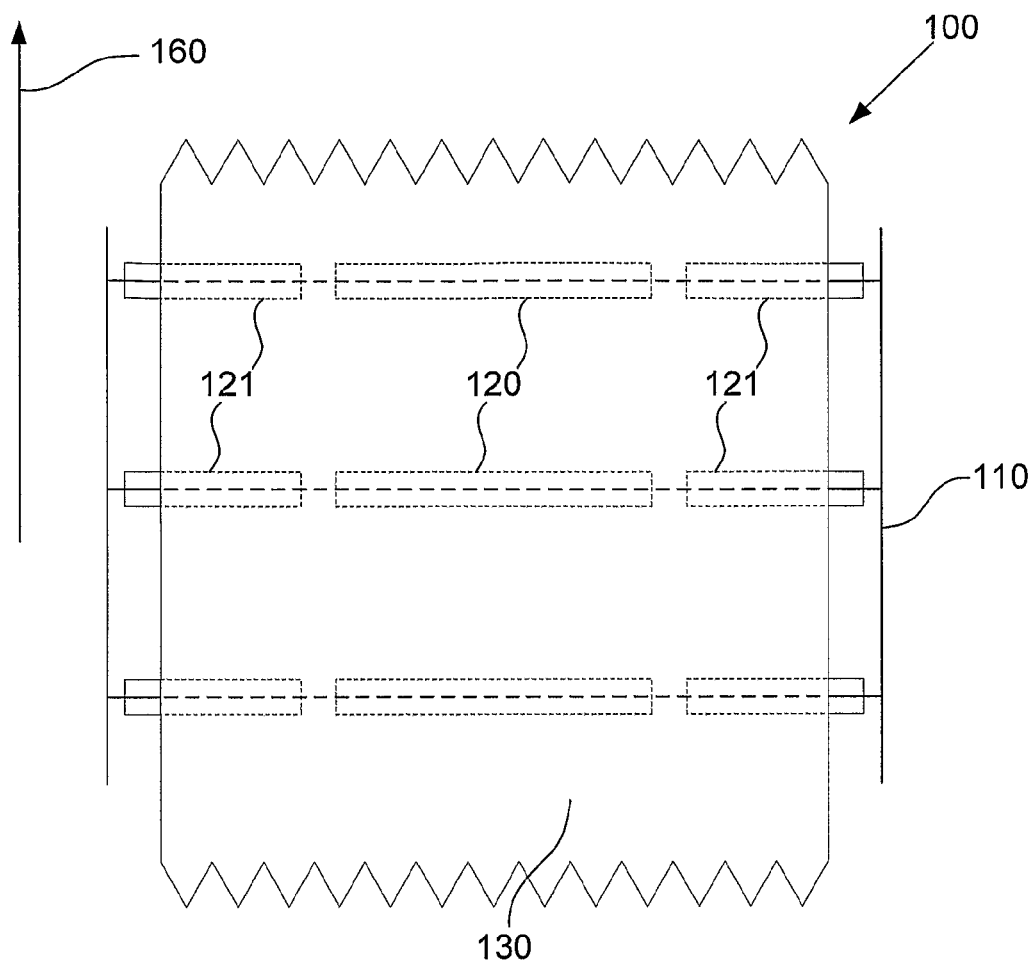
FIG. 2A shows a schematic plan view of an example of a section of a conveyor belt system.
Figure 2B:
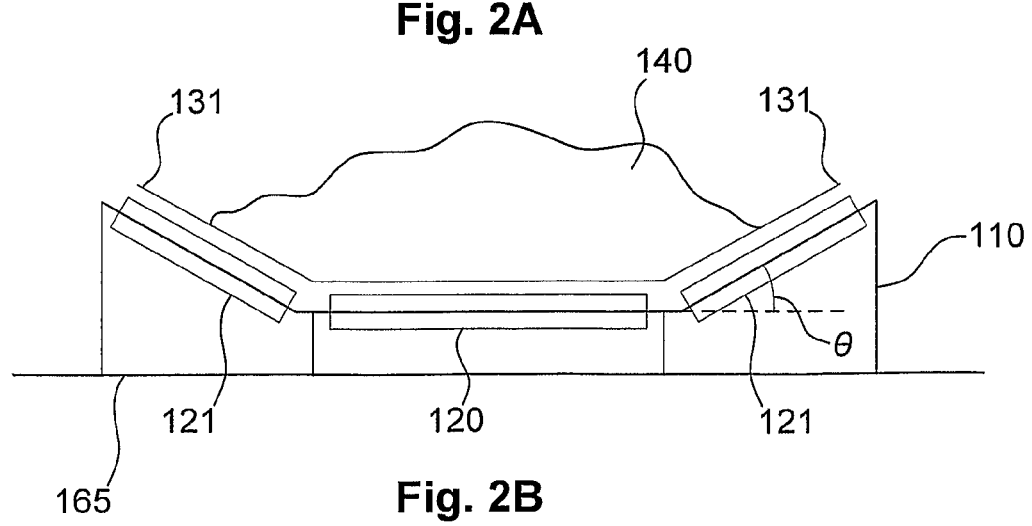
FIG. 2B shows a schematic end view of the conveyor belt system section of FIG. 2A.

In particular, FIGS. 2A and 2B show an example of a section of an unmodified conveyor belt system. The section of the conveyor belt system 100 includes a support frame 110 that supports a number of idler rollers 120, 121. An endless conveyor belt 130 is entrained around the idler rollers 120, 121, as will be appreciated by persons skilled in the art, allowing the conveyor belt 130 to move over the rollers in the direction of arrow 160.

It will be appreciated that in practice the conveyor belt system will typically be of a greater length, include an appropriate drive mechanism and a return path for the conveyor belt. It will therefore be appreciated that the section shown is for the purpose of example only.

In this example, the idler rollers include centre idler rollers 120 arranged substantially horizontally, and outer idler rollers 121 can be inclined at an angle θ to a horizontal support 165, such as the ground, so that the conveyor belt 130 is raised at outer edges 131. This is to ensure that material, shown generally at 140 remains confined to the conveyor belt 130 and does not fall there from.

As shown in FIG. 2A, each of the idler rollers 120, 121 can be arranged with their axes perpendicular to the direction of travel 160 of the conveyor belt 130.

Figure 2C:
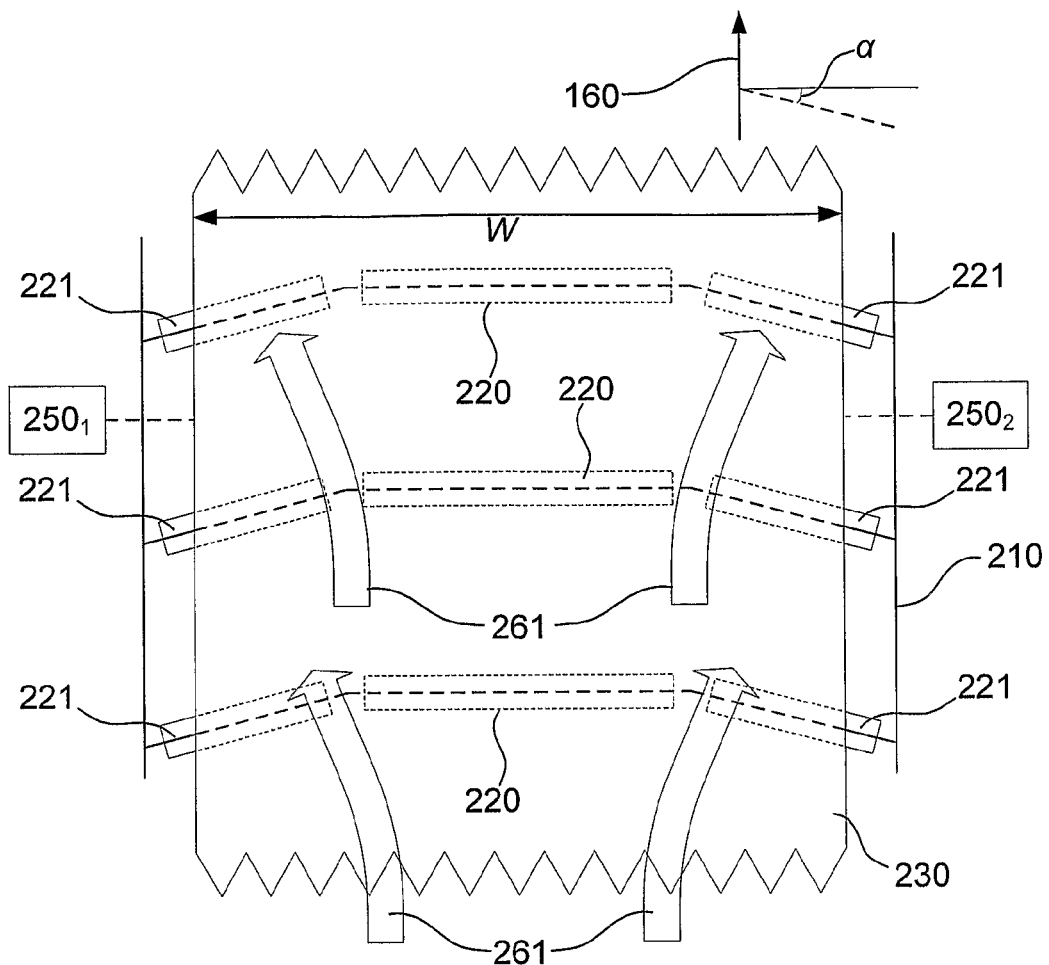
FIG. 2C shows a schematic plan view of a section of a modified conveyor belt system.
Figure 2D:
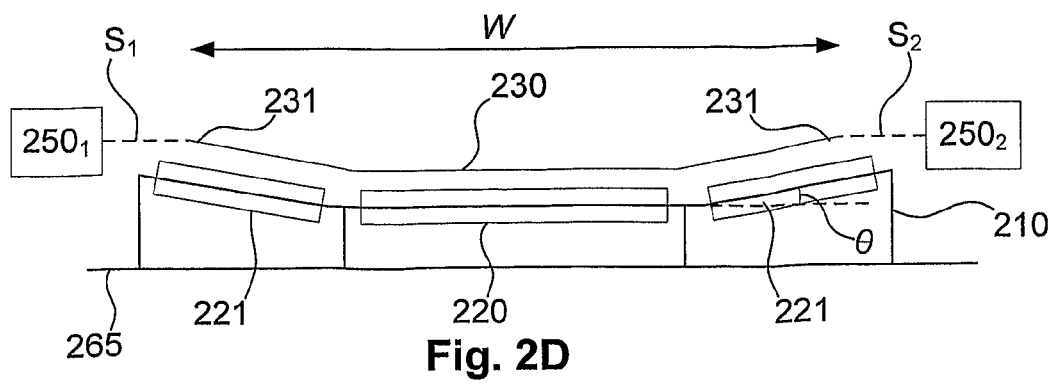
FIG. 2D shows a schematic end view of the conveyor belt system section of FIG. 2C.

Referring to FIGS. 2C and 2D, there is shown the modified section of the conveyor belt system of FIGS. 2A and 2B. In particular, the section of the conveyor belt system 200 includes a support frame 210 for supporting a number of idler rollers 220, 221, which in turn support an endless conveyor belt 230, to allow movement of the conveyor belt in the direction of arrow 260, as will be appreciated by persons skilled in the art.

In contrast to the example of FIGS. 2A and 2B, in this example, the outer rollers 221 are arranged with their axes at an angle α to a direction perpendicular to the direction of motion 260 of the conveyor belt 230. As a result, as the conveyor belt 230 moves over the idler rollers 221, this generates an outward lateral force that is applied to the conveyor belt 230, as shown by the arrows 261. This in turn provides a force extending laterally across the conveyor belt, in a direction perpendicular to the direction of motion 260, thereby operating to move the conveyor belt in a width wise fashion. This operates to exacerbate the effect of any flaws, such as rips, of the belt width, as will be described in more detail below.

In order to further enhance the effect of the lateral force, it may be desirable to adjust the angle θ at which the outer idler rollers 221 are provided with respect to the horizontal or ground 235. The reason for this is that having a steep angle θ can reduce the impact of the lateral force, and in particular, reduce the increase in belt width that will result from any rips or other flaws. Accordingly, in one example, the angle θ of the outer idler rollers 221 with respect to the horizontal is also typically reduced as compared to the configuration shown in FIG. 2B, as shown in FIG. 2D. In one example, the outer idler rollers 221 can be arranged horizontally, such that the angle θ is 0°, as shown in FIG. 1B.

In order to further enhance the lateral force, the outer idler rollers 221 may be rubber lagged to increase the coefficient of friction between the belt and the idler rollers.

The conveyor belt system is also modified to include two sensors positioned on opposing sides of the conveyor belt 230 as shown generally at 2501, 2502. Whilst two sensors are shown in this example, one sensor on each side of the belt, this is not essential, and any suitable number of sensors may be used. In this example, the sensors 2501, 2502 are adapted to detect a distance between each sensor 2501, 2502 and a corresponding edge 231 of the conveyor belt 230, as shown generally at $S_1$, $S_2$. The sensors 2501, 2502 then typically provide an analogue output representing a scaled measurement equal to the distance between the sensor 2501, 2502 and the belt edge, although any suitable form of output can be used. The analogue output can be used to determine information indicative of the width W of the conveyor belt 230, which in turn allows a determination of whether an operating irregularity such as a belt rip, belt wander or edge damage to be detected, as will be described in more detail below.

In one example, operating irregularity detection need only be performed in a section of an overall conveyor belt system, and accordingly, it will be appreciated that a conveyor belt system similar to that described above with respect to FIGS. 2A and 2B can be implemented, with a section of the overall belt system being modified or retrofitted as described above with respect to FIGS. 2C and 2D.

In another form, a plurality of sensor pairs may be positioned along the length of the conveyor belt. This arrangement can help assist early detection of an operating irregularity such as a belt rip, belt wander or edge damage as a full revolution of the belt is not required in order to detect an issue with the operation of the conveyor belt.

Figure 3:
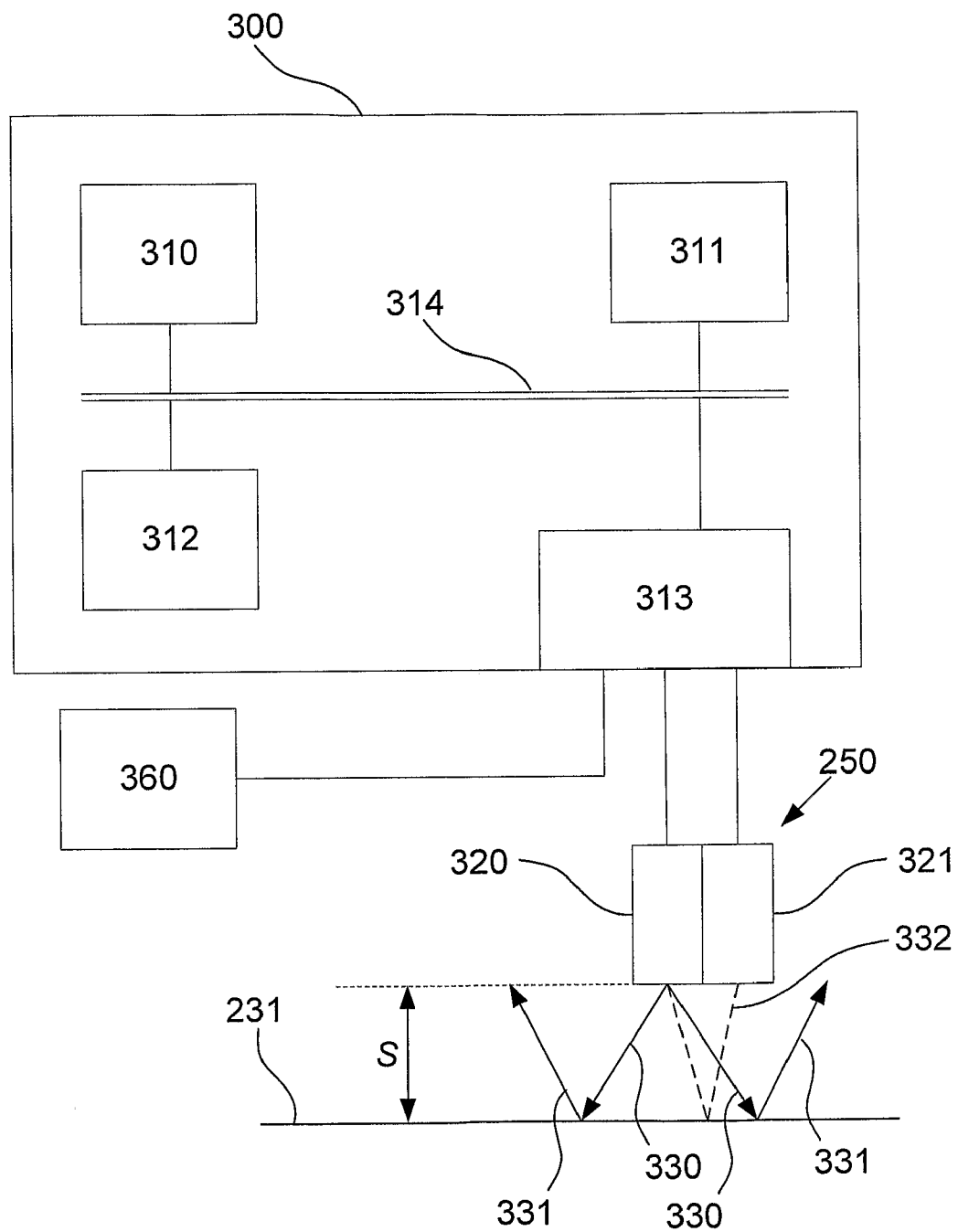
FIG. 3 is a schematic diagram of an example of a sensor system.

An example of a detection system will now be described with reference to FIG. 3.

In this example, the detection system is formed from a processing system 300 coupled to each of the sensors 2501, 2502, with only a single sensor 250 being shown in this example for clarity purposes.

As shown, the sensor includes a transmitter 320 and a corresponding receiver 321. In use, the processing system 300 controls the transmitter 320 causing it to emit signals, such as electromagnetic radiation, sound waves, ultrasound waves, or the like, as shown by the arrows 330. The signals are reflected from the conveyor belt edge 231, as shown by the arrows 331, with at least some of the reflected signals impinging on the receiver 321, as shown by the dotted line 332. An indication of the received signals are then provided to the processing system 300, allowing the processing system 300 to analyse the received indication, and determine the separation S.

The manner in which the separation is determined, will depend on the preferred implementation and the nature of the signals. This could include, for example, determining attenuation of the reflected signal, or more typically, determining the time taken for the signal to travel from the transmitter 320 to the receiver 321, after reflection from the conveyor belt edge 231.

It will therefore be appreciated that the transmitter 320 and receiver 321 could be any form of distance detection system, and that in some examples the transmitter and receiver could be formed from a single element capable of performing both tasks, and need not be separate elements per se. In one example, the transmitter 320 and the receiver 321 form an ultrasonic system.

It will be appreciated from the above, that in use, the processing system 300 can be configured to control the transmitter 320, receiving an indication of received signals from the receiver 321, and then using this information to determine the separation S. The separation S between each sensor and the respective belt edge can then be used to determine the transverse displacement of the belt.

Accordingly, any form of suitable processing system 300 may be used. In the current example, the processing system 300 includes at least a processor 310, a memory 311, an input/output (I/O) device 312, such as a keyboard and display, and an external interface 313, coupled together via a bus 314 as shown.

In use, the processor 310 executes instructions held in memory 311, allowing the transmitter 320 to be controlled, and to allow indications received from the receiver 321 to be interpreted. An indication of any determined results can then be presented to an operator using the I/O device 312.

Additionally and/or alternatively, the processing system 300 may be adapted to control operation of the conveyor belt system, for example to allow the conveyor belt 230 to be stopped in the event that an operating irregularity is determined to have occurred for the conveyor belt such as a belt rip, unacceptable belt wander, edge damage or other flaw is detected. This can be achieved in any suitable manner, such as by coupling the processing system 300 to a conveyor belt drive system 360, via the external interface 313.

Accordingly, it will be appreciated that the processing system 300 may be formed from any suitable processing system, such as a suitably programmed PC, or custom configured device, such as a micrologic controller, field programmable gate array (FPGA), programmable logic controller (PLC), or the like.

Figure 4:
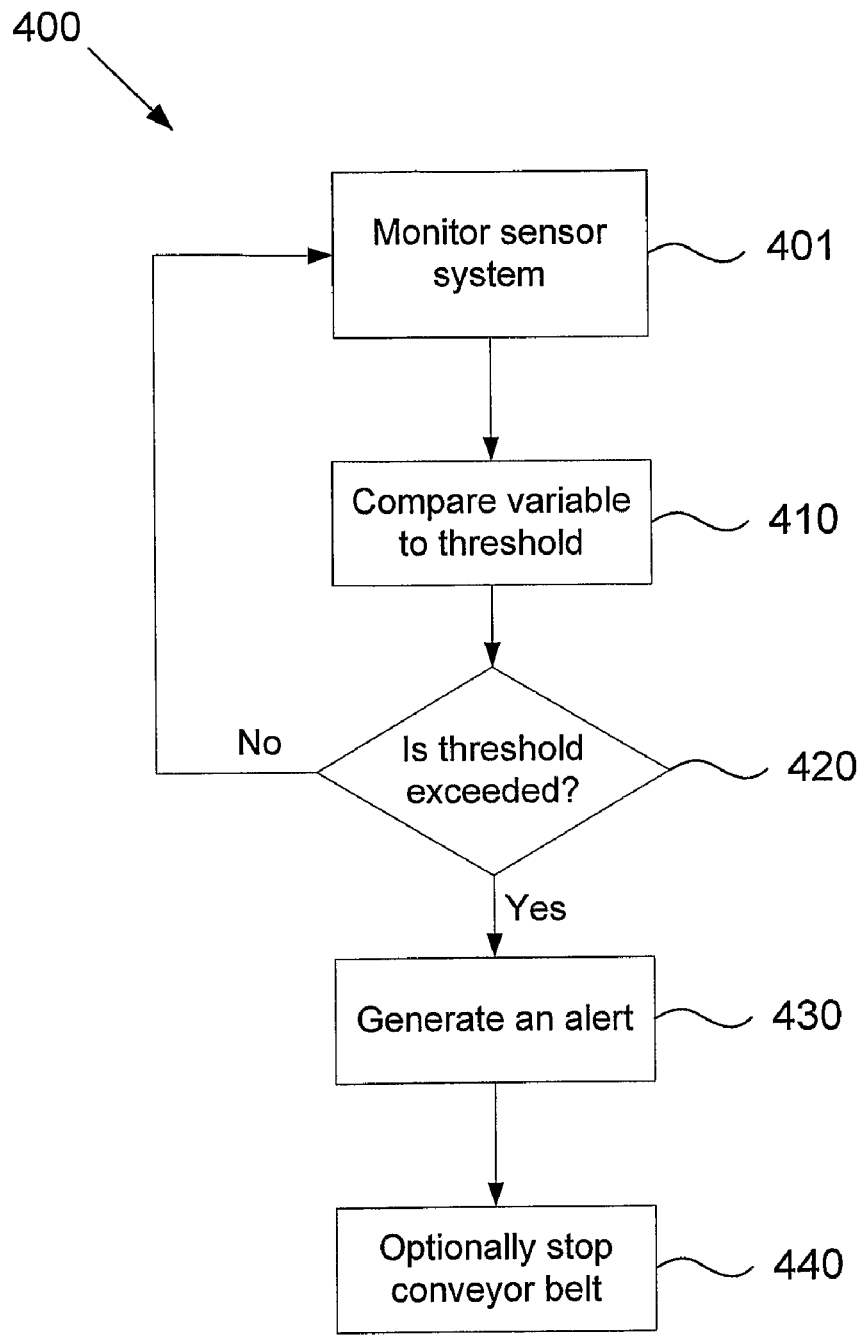
FIG. 4 is a flow chart of an example of an operating irregularity detection process.

An example of the method 400 in which the processing system 300 operates to monitor the operation of a conveyor belt will now be described with reference to FIG. 4.

In this example, at step 401 the processing system 300 monitors the sensors 250 to detect the transverse displacement of the conveyor belt associated with each sensor 2501, 2502.

At step 410 the transverse displacement of each edge of the belt, or one or more variables based thereon, are used with one or more operating rules to determine if an operating irregularity has occurred. The operating rules may include comparing a threshold or other value, to determine if an operating irregularity has occurred including a belt rip, belt wander or edge damage. At step 420 it is determined that the threshold is exceeded, and if not the process returns to step 401 to continue monitoring.

Otherwise, if it is determined that the threshold is exceeded at step 420 then the process moves on to step 430 with the processing system generating an alert. Additionally and/or alternatively, the conveyor belt may be stopped at step 440.

It will be appreciated that the comparison to the threshold may be performed in any one of a number of manners and this is influenced by the nature of conveyor belt operating irregularities, examples of which will now be described with reference to FIGS. 5A and 5B.

Figure 5A:
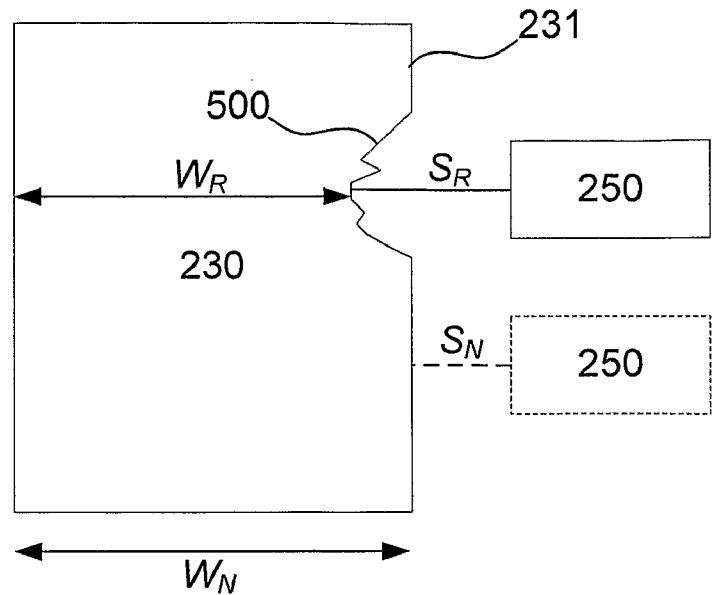
FIG. 5A is a schematic plan view of a first type of an operating irregularity.

In the example of FIG. 5A, edge damage 500 has occurred on an edge 231 of the conveyor belt 230 as shown. This results in a reduction of the belt width from a normal belt width $W_N$ to a damaged belt width $W_R$. It will be appreciated that this similarly results in a difference in separation S between the sensor 250 and the belt edge 231, so that the separation at the rip $S_R$ is greater than the separation in a normal or non-damaged section of the belt 230, as shown at $S_N$.

Accordingly, in this instance a damaged edge can be detected by determining if a variable indicative of the measured separation S is greater than that of a normal separation $S_N$. Typically however, the exact position of the belt is subject to some natural variation and it is therefore necessary to define a threshold value slightly above the normal separation $S_N$ to avoid false positive indications of a damaged edge. In one example, the threshold can be set based on a percentage difference from the normal separation $S_N$ (eg: $S_N+1\%$) although any suitable value, such as a predetermined distance (eg: 1 cm) from the normal separation $S_N$, or as manually selected value, can be used.

As an alternative to using the separation, the processing system 300 can use a known separation between the sensors 2501, 2502, together with the measured separations $S_1$, $S_2$ to determine a variable indicative of the current belt width W. The current belt width W can then be compared to the normal belt width $W_N$, or a threshold value based or otherwise derived therefrom, to again determine whether damage has occurred in a similar manner.

Figure 5B:
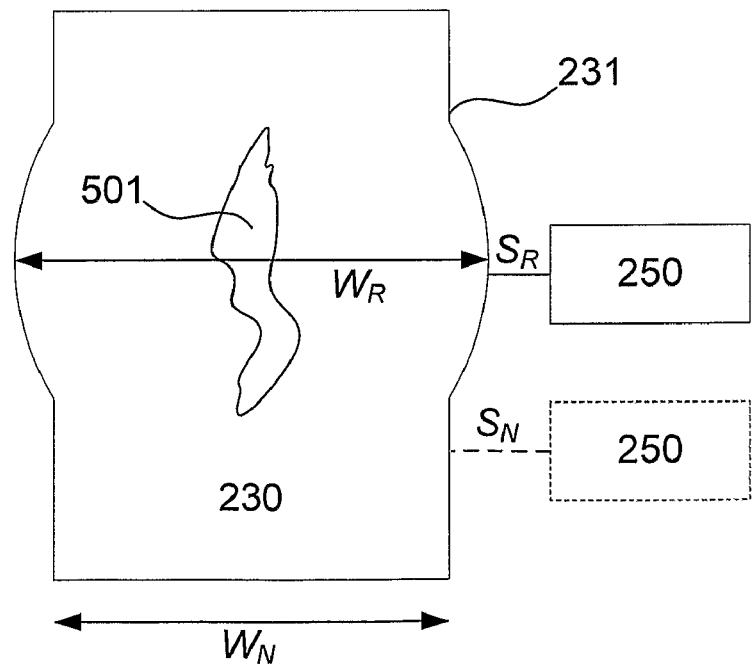
FIG. 5B is a schematic plan view of a second type of an operating irregularity.

In the example of FIG. 5B, a rip 501 has occurred in the middle of the belt 230. If this occurs in the conveyor belt system of FIG. 2A, then with the idler rollers 120, 121 arranged perpendicularly to the direction of motion 160 of the conveyor belt 130, then in general, the rip 501 would not have any impact on the belt width.

However, in the example of the apparatus of FIGS. 2C and 2D, the lateral outward force generated by the outer idler rollers 221 causes the belt to be moved in a width wise direction. This causes the rip 501 in the middle of the belt 230 to be opened up, so that the belt width in the rip region $W_R$ is greater than the normal width of the belt $W_N$.

It will be appreciated that this may therefore be used in a similar manner to that described above to allow a rip to be detected. However in this instance, a rip is determined if one or both of the measured separations $S_1$, $S_2$ are less than the normal separation $S_N$, or a threshold value based or otherwise derived therefrom, or if the measured belt width W is greater than the normal belt width $W_N$ or a threshold based on or derived therefrom, then damage is again determined.

It will therefore be appreciated that during the comparisons at step 420, the comparison may be performed either based on one or both of the separations $S_1$, $S_2$, and/or on the overall belt width W. Furthermore, the comparison typically involves comparing these values to both upper and lower threshold values to allow detection of both of the types of rips shown in FIGS. 5A and 5B. Thus, variables such as the separations $S_1$, $S_2$ and/or the belt width W can be compared to threshold values, so that the threshold is exceeded if the variable is below a lower threshold value or above an upper threshold value.

Figure 5C:
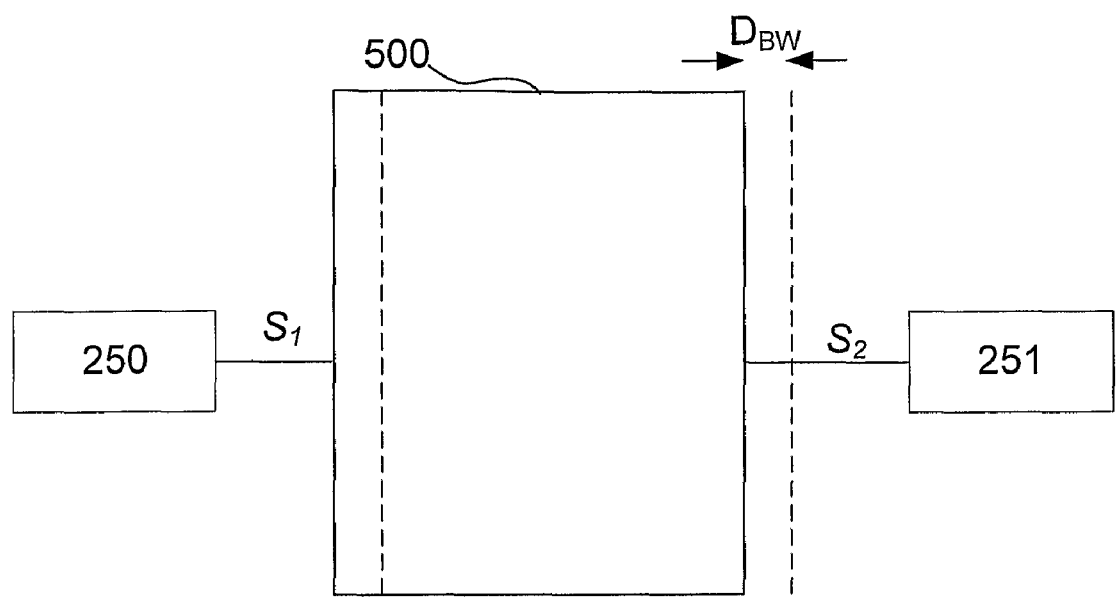
FIG. 5C is a schematic plan view of a third type of an operating irregularity.

Referring to FIG. 5C there is shown an example of detecting an operating irregularity of belt wander for belt 500. In particular, FIG. 5C shows the belt has moved to the left by distance $D_{BW}$ due to the conveyor belt suffering some degree of belt wander. The dotted line in FIG. 5C shows the reference position of the conveyor belt. In this instance, the transverse displacement $S_1$ and $S_2$ for each edge is measured via sensors 250 and 251.

Accordingly, in this instance, unacceptable belt wander can be detected by determining that both edges have incurred a transverse displacement and that the measured distance for one sensor has increased and that the other measured distance has decreased for the other sensor. Once these characteristics have been identified, the smaller distance is subtracted from the larger distance to determine a measured belt wander distance. The measured belt wander distance is then compared against a normal amount of belt wander distance. If the measured belt wander distance exceeds the normal amount of belt wander, then an operating irregularity of belt wander has been identified. As also discussed above, a percentage difference from the normal belt wander distance may be used to determine if an operating irregularity has occurred.

It will therefore be appreciated that the above described process operates by moving the conveyor belt in a width wise direction, and then measuring a variable indicative of the resulting belt width. This allows the processing system 300 to determine if there is any deviation between the measured variable and an expected value. This, in turn, allows the processing system 300 to determine if it is likely that the belt is damaged and then take appropriate action.

The nature of any action taken may vary depending on the preferred implementation. Thus, in one example, an alert can be generated, allowing the belt to be inspected manually, to allow assessment of whether the conveyor belt needs to be repaired or replaced. Alternatively, the conveyor belt can simply be stopped to prevent further damage.

In one example, the processing system 300 may make an assessment as to whether to generate an alert, or stop the belt, based on the results of the comparison. Thus, for example, two upper and lower threshold values could be defined. In this instance, if only the first threshold value is exceeded, then this indicates that whilst damage is present, this is currently only minor, and hence the conveyor belt can continue operating, so only an alert is generated. However, if the second threshold value is also exceeded, representing a greater deviation from the expected normal belt width $W_N$ being exceeded, then this could indicate a more serious damage or tracking has been detected, and the conveyor belt could be shut down so immediate corrective action could be taken.

However, typically the processing system 300 will operate to stop the conveyor belt in the event that any operating irregularity is detected, thereby allowing an operator to manually assess what action should be taken.

Thus, as will be appreciated by persons skilled in the art, the processing system can be adapted to not only determine the presence of an operating irregularity, but also to assess the magnitude and hence severity of the damage, and thereby take appropriate action.

In one example, the measuring procedure can be performed along a section of the conveyor belt system so that the entire length of the conveyor belt is monitored as it passes through this section.

In general, in the event that damage is present, the effect of moving the belt in a lateral width wise direction could exacerbate the severity of rip, and this could result in a loss of any material thereon. Thus, for example, material can fall through the rip in the belt and land on the return side of the conveyor belt path. A further issue is that the weight of any material on the belt, could impact on the measurement process.

Accordingly, in one example, the rip detection is performed on a section of the conveyor belt system where material 140 is not present on the conveyor belt 230. Thus, this could be performed by positioning the lateral force generating idler rollers either after the immediate transfer on the carry side of the belt, or behind the transfer on the return side of the belt.

However, this is not essential, and in some examples, it may be preferred to perform the monitoring in a region of the conveyor belt where material is present. An example of this will now be described with reference to FIGS. 8A and 8B.

In this example, a return belt path is also shown. Accordingly, the conveyor belt system includes idler rollers 220, 221 for supporting the conveyor belt 230, to allow transport of material 140 in the direction of arrow 160, as described above. The conveyor belt 230 passes around a drive roller 800, and is then supported by return path idler rollers 820, with the conveyor belt on the return path being indicated by the reference numeral 830.

In this example, should a rip occur in the conveyor belt 230, then this can allow material 140 to fall through the conveyor belt 230, as shown by the arrow 850, thereby resulting in material 840 being transported along the return path in a direction opposite to that of the arrow 160.

Detectors can be provided for sensing material on the return belt path, which can be indicative of a belt rip. In one example, this is achieved by having a member, or other sensor, extend across the conveyor belt return path, as shown at 850, so that the presence of any material can be detected. Thus, for example, an optical sensing system can be used, in which a radiation source, such as a laser sensor, generates a beam of light that extends across the return path to impinge on a corresponding sensor. Alternatively, a physical member, such as a piece of wire or the like, can extend across the return path at 850, with the wire being disturbed or broken should material impinge thereon, thereby allowing the presence of material 840 to be determined.

In any event, in such systems, if material is detected on the return path conveyor belt 830, this is indicative of a belt rip or spillage in the conveyor belt 230, and this can therefore be used to stop the conveyor or generate an alert, in a manner similar to that described above. Thus, for example, any detection system can be coupled to the processing system 300, allowing the processing system 300 to receive signals from the detection system and determine from the signals if material is present on the belt return path. In this instance the processing system can then stop the conveyor or generate an alert as required. In a preferable form, the detection system is a radiation source, such as a laser beam wherein when laser beam's path is broken by material, an operating irregularity has been detected.

Figure 8A:
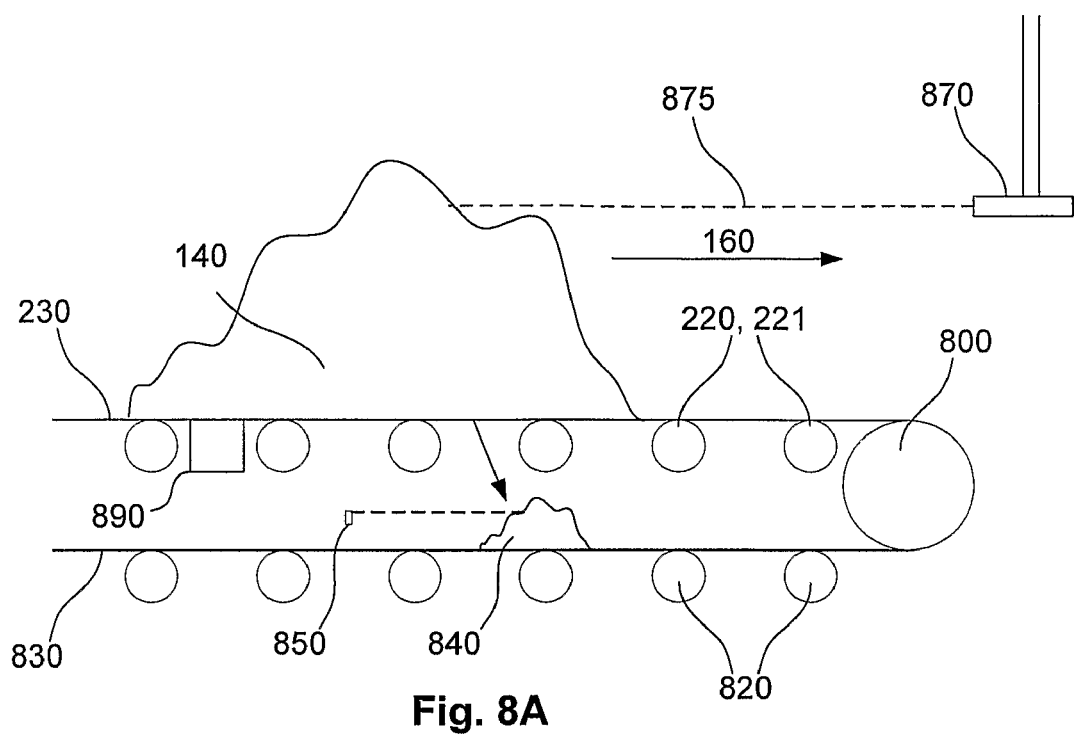
FIG. 8A is a schematic of a first example of monitoring a region of the conveyor belt where material is present.
Figure 8B:
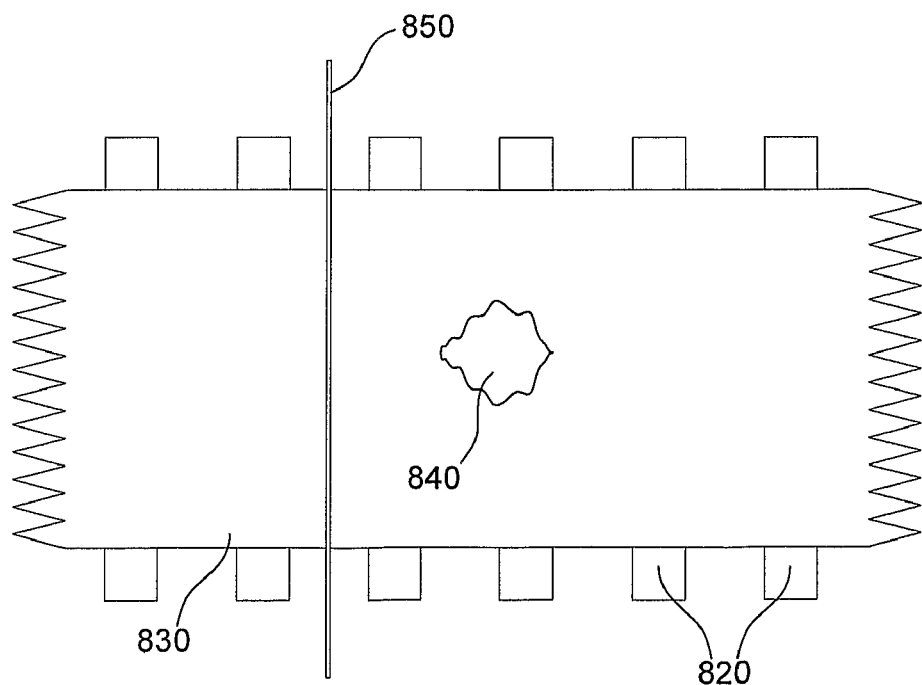
FIG. 8B shows a second example of monitoring a region of the conveyor belt where material is present.

Still referring to FIG. 8A, a detector in the form of a sensor, such as a laser sensor 870, may be configured to sense if material upon the conveyor belt is equal to or above a maximum height considered acceptable for the particular conveyor belt. In particular, the laser sensor 870 emits a laser beam 875 which if broken by material is detected by the laser sensor is determined by the detection system as being indicative of an operational irregularity. Whilst the laser sensor 870 is shown located at one end of the conveyor belt, this is merely shown for clarity purposes and thus the laser sensor 870 can be directed across the width of the conveyor belt. Additionally, as discussed above, the maximum height detector can be provided in the form of other forms of sensors such as a physical member like a wire or the like.

It will be appreciated that in the above described examples, in which the belt is urged apart as shown by the arrows 261 in FIG. 2C, then this causes an increase in the effective size of any rip, which in turn can lead to an increase in any material falling through the conveyor belt 230 and onto the conveyor belt 830 on the return path. From this, it will be appreciated that the use of idler rollers 221 to spread the conveyor belt 230 in a lateral direction can also increase the effectiveness of existing belt management detection systems, which therefore may be used in addition or alternatively, to the belt rip sensors 250.

It will be appreciated by persons skilled in the art, that the use of angled idler rollers 221, which operate to urge the conveyor belt in a lateral direction can therefore additionally, or alternatively be used with any belt monitoring detection system that is capable of detecting material on the conveyor belt return path.

Figure 6:
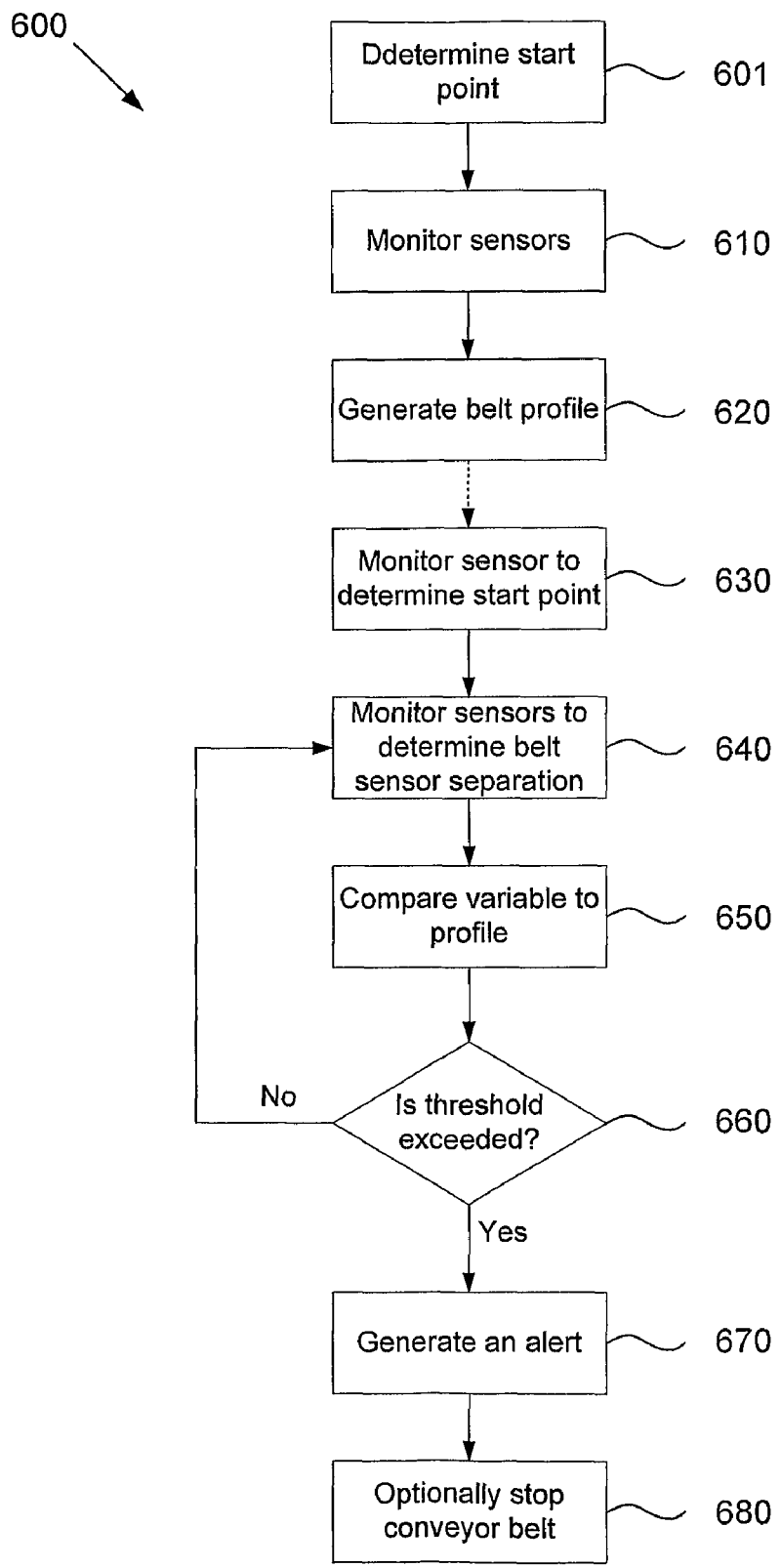
FIG. 6 is a flow chart of a second example of operating irregularity detection process.

It will also be appreciated from the above that a range of different procedures could be performed by the processing system 300 in order to detect defects in the operation of the conveyor belt, and an example of an alternative belt monitoring process 600 will now be described with reference to FIG. 6.

In this example, a configuration phase is used to determine a belt width profile along the length of the belt. This is performed when it is known that the conveyor belt is either undamaged, or at least operating in accordance with acceptable parameters. Thus, the belt may include minor edge rips which are not material to the operation of the conveyor belt system, in which case even though damage exists, it may therefore be desirable to continue operation of conveyor belt system.

To generate the profile, at step 601, the processing system 300 monitors the sensors 250 to determine a start point. The start point represents a fixed point on the belt from which the profile is measured, and may be indicated by an appropriate indicator on the conveyor belt 230, such as a designated protrusion or depression of a set length, or by any other appropriate mechanism, which can preferably be detected using the sensor 250. In another form, the start point may be an RFID tag which is installed in or upon the conveyor belt which can be sensed to indicate a revolution of the conveyor belt.

At step 610 the processing system 300 monitors the sensors 250 to determine how the separations $S_1$, $S_2$, or one or more variables based thereon, such as the belt width, change as the conveyor belt moves passed the sensors 250. This process may be continuous, or may involve periodic measurements as will be appreciated by persons skilled in the art.

The process is continued until the processing system 300 detects the start point, indicating that an entire revolution of the conveyor belt has been completed. At this point the separation measurements $S_1$, $S_2$, or other derived variable such as the belt width W, can be used to generate a belt profile at step 620.

By performing this configuration process when it is known that the conveyor belt is in an acceptable working condition, then this allows an acceptable profile of the separations $S_1$, $S_2$, or the belt width W, to be generated at step 620. In one form, a newly installed belt may be monitored during this configuration process in order to determine a belt profile.

Once the profile has been generated, this allows monitoring to be performed so that deviations from the profile can be used to assess whether an operating irregularity has occurred. At this point, the configuration process has completed, as indicated by the broken arrow between steps 620 and 630.

In a variation, the start position can be used to determine if an operating irregularity has occurred as described in relation to steps 630 onwards.

At step 630 the processing system 300 monitors the sensor to determine the start point and then monitors the sensors 250 at step 640 to determine the belt sensor separations $S_1$, $S_2$. The start point is determined such that the measured values from the sensors are compared against the corresponding measurements of the profile. This information, or a variable based thereon, such as the belt width W is then compared to the generated profile, at step 650.

At step 660 it is determined if the current measured separations $S_1$, $S_2$ or width W differ from the profile by more than a predetermined amount, which may for example be defined as a threshold. As in the previous example, both upper and lower thresholds may be defined to ensure both of the irregularity types described above can be detected. If not, the process returns to step 640 to allow monitoring to continue.

However, if it is determined that the difference exceeds the threshold, then at step 670 an alert is generated, and/or the conveyor belt can be stopped at step 680, in a manner similar to that described above.

Accordingly, in this example, a profile is generated for a particular conveyor belt, with comparisons then being performed with respect to this profile, thereby allowing variations in belt width over time to be easily detected. This in turn allows for the easy and accurate detection of an operation defect which can in turn lead to early system failure detection. It will be appreciated that this profile is specific to the respective conveyor belt system and accordingly, a profile would need to be developed for each conveyor belt system. However, by developing a profile specific to the conveyor belt, this takes into account an acceptable belt configuration and is therefore less prone to error, as may occur for example due to natural variations in belt width.

From this, it will be appreciated that the processing system 300 may include a range of configurable parameters that can be used in different belt damage detection processes, and these can include any one or more of:
- a maximum belt width;
- a minimum belt width;
- a belt length, which can be used for 'average belt width' calculation; and,
- a belt velocity, which can be used for 'average belt width' calculation.

Other parameters may also be stored as will be appreciated by persons skilled in the art. This allows the processing system to determine a number of parameters relating to operation of the conveyor belt system including:
- a belt width;
- belt tracking; and,
- an 'average belt width'.

In a variation, multiple sets of parameters may be stored by the processing system, wherein each set of parameters can be used for comparison depending upon the weight of material which the belt, or a portion thereof, is supporting. In one form, a first set of parameters may be generated when no weight is supported upon the conveyor belt, and then a second set of parameters may be generated when a particular weight of material is support upon the conveyor belt, or a portion thereof. When the conveyor belt is operating, one of the set of parameters can be used for determining if an operating irregularity has been detected based upon the weight of material which is being supported. In one example, the user may select the appropriate set of parameters to be used by using an input device of the processing system, such as a keyboard, mouse or the like, to indicate the set of parameters for use according to the weight of material supported on the belt. However, in an additional or alternate form, the apparatus may include one or more weight sensors 890 coupled to the processing system which senses the amount of weight supported by the belt, or portion thereof. The processing system uses the sensed weight to automatically select the applicable set of parameters according to the sensed weight.

In the above described examples, the outer idler rollers 221 are provided at an angle α to a direction perpendicular to the direction of motion of the conveyor belt 230. This is performed to move the belt in a width wise direction and exacerbate the effect of any damage It will be appreciated that in some circumstances it may be desirable to adjust the magnitude of the force applied to a system to ensure movement.

It will be appreciated that the processing system 300 may also perform additional functionality. For example, by comparing differences between the current measured separations $S_1$, $S_2$ the processing system 300 can determine tracking for the belt, and this may additionally be used to generate an alert or stop the conveyor belt in the event that the belt is not tracking correctly.

The processing system 300 can also store a record of any measurements made, such as any current measured separations $S_1$, $S_2$ allowing these to be subsequently retrieved. In this regard, by having the processing system 300 also store an indication of when the measurement was made, such as a time and date stamp, this allows the measurements to be subsequently reviewed, which can be useful for identifying events that contribute towards operating irregularities.

Thus, for example, certain events, such as activation of a feed chute, could cause changes in belt width as material is added to the belt. In this instance, repeated activation of the chute could ultimately contribute to belt damage. However, by reviewing the changes in belt width that occur when the chute is activated, this can allow operators to assess the impact of this event, and determine if changes are required, for example in the activation process.

Adjustment of the lateral force applied to the belt can be adjusted by controlling the angle α and an example of a system for achieving this will now be described with reference to FIGS. 7A to 7C.

In this example, a frame member 700 has a connector 710 movably mounted thereon to allow the connector 710 to be moved to any position along the frame member 700. The connector 710 can be held in a desired position using any appropriate locking means. The idler roller 221 is supported by an axle 730 having a first end mounted to the connector 710 and a second end mounted to a support 740. The mountings to the connector 710 and the support 740 are arranged to allow the angle at which the axle extends from the connector 710 and the support 740 to vary as required. In addition to this, the axle 730 can be formed from first and second axle portions 731, 732 which cooperate to provide a telescopic arrangement, allowing adjustment of the axle length.

Figure 7A:
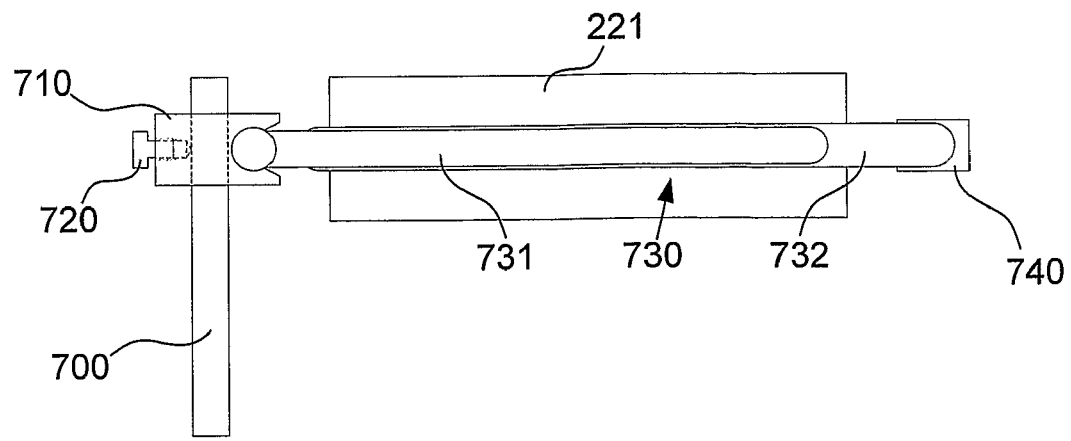
FIG. 7A is a schematic diagram of an example of an idler roller position adjustment system.
Figure 7B:
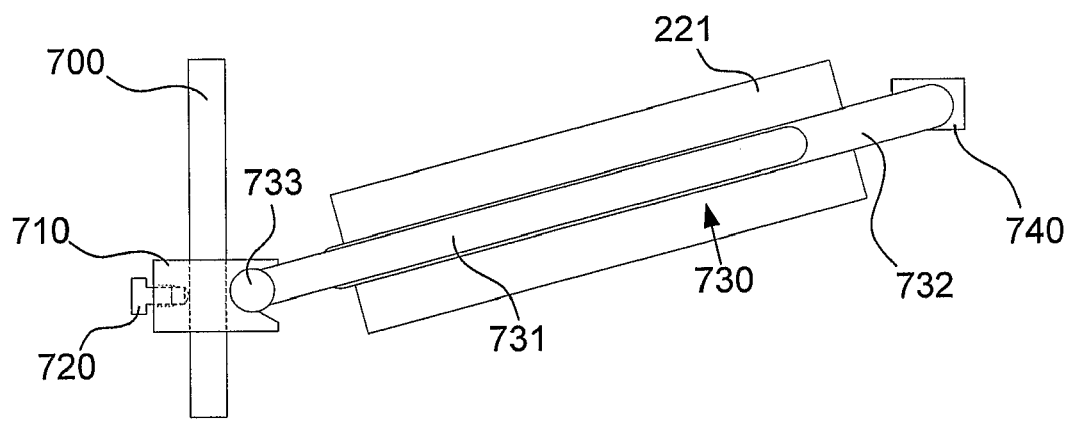
FIG. 7B is a schematic diagram of the idler roller position adjustment system of FIG. 7A in a different position.

In use, this allows the connecting member 710 to be moved along the frame member 700 as shown in FIG. 7B. The axle mountings allow the axle to remain attached to the connector 710 and the support 740. With the support 740 remaining stationary, the angle α is adjusted, thereby varying the magnitude of the lateral force that will be applied to the conveyor belt 230, as will be appreciated by those skilled in the art.

In one variation, the nature of the connector 710 and the axle mountings can vary depending on the preferred implementation. In one example, the connector is as shown in FIG. 7C. In this example, the connector 710 includes a first aperture for receiving the frame member 700, to allow relative movement of the connector 710 along the frame member 700. A second aperture 712 is provided for receiving a locking means, such as a thumbscrew 720, which can be urged against the frame member 700, to thereby hold the connector 710 stationary relative to the frame member 700.

A socket 713 is also provided which can cooperate with a ball provided on the first axle portion 731 to provide a ball and socket connection, which allows relative movement of the axle 730 with respect to the connector 710. It will be appreciated that the second axle portion 732 can be coupled to the support 740 using a similar arrangement.

Figure 7C:
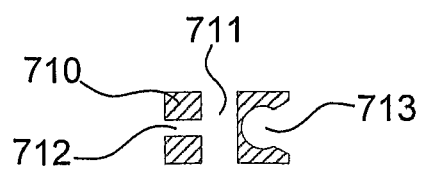
FIG. 7C is a schematic cross sectional view of an example of the connector of FIG. 7A.

It will also be appreciated that in situations where it is desirable to adjust the angle of the idler rollers 221 with respect to the horizontal or ground 265, this can be achieved in a similar manner, or by allowing adjustment of a height of the frame member 700 relative to the ground 265 in the arrangement of FIGS. 7A to 7C.

It will be appreciated that the above described system therefore utilises belt width sensing to thereby allow for accurate and reliable belt damage detection.

In particular, the system is capable of detecting rips where the conveyor belt is ripped in a lengthwise direction, but the full belt is still conveyed along, as well as when an edge of the belt is cut and the belt width reduced.

In the first instance, idler rollers are configured to apply a lateral force to the belt and therefore draw the belt apart in the event that damage occurs. This results in a corresponding change in belt width, which can then be detected using suitable belt width sensing. Similarly, in the event of an edge rip, the belt width sensing can also detect the associated change in belt width.

In practice, the sensing may be performed when material is not present on the conveyor belt, and this is therefore typically achieved by positioning the lateral force generating idler rollers either after the immediate transfer on the carry side of the belt, or behind the transfer on the return side of the belt.

Alternatively, it may be desirable to perform sensing when material is present on the conveyor belt, so that this can be used to allow detection systems that detect material on the return belt path to function more effectively.

The unit utilises remote distance sensing systems, which therefore do not need to physically contact the belt, thereby reducing the likelihood of failure. Furthermore the system does not require any antennae to be embedded in the belt, thereby removing the need to custom and expensive conveyor belts. The system also will check the entire length of belt and not just set lengths as some other systems do.

It will be appreciated that the system therefore provides a simple and robust technique for detecting belt damage, thereby resulting in an easily maintainable device that can be understood and serviced by site personnel and not require the need for specialized people to maintain.

The system will also work on any belt or construction, and does not require a specific configuration of conveyor belt, such as a belt incorporating antennae, is used.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. An apparatus for monitoring operation of a conveyor belt, wherein the apparatus includes a detection system configured to:
   detect transverse displacement of each edge of a portion of the conveyor belt as the conveyor belt travels past the detection system; and
   determine, using the transverse displacements of the edges of the conveyor belt and one or more operating rules, if an operating irregularity of the conveyor belt has occurred; rollers including angularly offset rollers supporting the conveyor belt, wherein the angularly offset rollers have an axis which are angularly offset relative to a transport direction of the conveyor belt for applying an outward transverse force toward opposing edges of the portion of the conveyor belt travelling past the detection system.

2. The apparatus according to claim 1, wherein the detection system uses the transverse displacements of the edges of the conveyor belt and the one or more operating rules to determine if an operating irregularity of the conveyor belt has occurred including at least one of:
   a rip in the conveyor belt;
   belt wander of the conveyor belt; and
   edge damage of the conveyor belt.

3. The apparatus according to claim 2, wherein the detection system is configured to detect at least one of:
   a height of material upon the conveyor belt; and
   material upon a return belt path;
   wherein detection of material is used with the one or more operating rules to determine if an operating irregularity has occurred.

4. The apparatus according to claim 1, wherein at least some of the rollers have an inclined axis for thereby raising opposing edges across the width of the conveyor belt.

5. The apparatus according to claim 1, wherein the rollers includes:
   a base roller having an axis substantially parallel with a substantially horizontal support surface;
   a first side roller having an axis which is inclined relative to the base roller for raising a corresponding first edge of the portion of the conveyor belt; and
   a second side roller having an axis which is inclined relative to the base roller and opposing inclined relative to the first side roller for raising a corresponding second and opposing edge of the portion of the conveyor belt.

6. The apparatus according to claim 1, wherein the detection system includes:
   at least one sensor for sensing operation of the conveyor belt; and
   a processing system coupled to the at least one sensor for determining if an operating irregularity has occurred for the conveyor belt.

7. The apparatus according to claim 6, wherein the processing system is for:
   receiving an indication of the operation of the conveyor belt from the at least one sensor;
   using the one or more operating rules by comparing a variable to a threshold, the variable being at least partially based on the indication; and
   determining the presence, absence or degree of an operating irregularity in accordance with the results of the comparison.

8. The apparatus according to claim 1, wherein, in response to determining an operating irregularity, the processing system is for at least one of:
   generating an alert; and
   stopping the conveyor belt.

9. The apparatus according to claim 1, wherein the detection system includes at least two sensors being positioned adjacent the edges of the belt to thereby allow the transverse displacement of each belt edge to be determined, wherein the transverse displacement is indicative of a distance between a respective belt edge and a respective sensor.

10. The apparatus according to claim 1, wherein the detection system includes at least one ultrasonic sensor.

11. The apparatus according to claim 1, wherein the detection system includes at least one belt return path sensor for detecting material on a belt return path.

12. The apparatus according to claim 1, wherein the detection system includes at least one material height sensor for detecting a height of the material upon the conveyor belt.

13. A method for monitoring operation of a conveyor belt, wherein the method includes, in a detection system, steps of
   detecting transverse displacement of each edge of a portion of the conveyor belt as the conveyor belt travels past the detection system; and
   determining, using the transverse displacements of the edges of the conveyor belt and one or more operating rules, if an operating irregularity of the conveyor belt has occurred; and applying an outward transverse force toward opposing edges of the portion of the conveyor belt travelling past the detection system via rollers including angularly offset rollers supporting the conveyor belt, wherein the angularly offset rollers have an axis which are angularly offset relative to a transport direction of the conveyor belt.

14. The method according to claim 13, wherein the method includes, in the detection system, using the transverse displacements of the edges of the conveyor belt and the one or more operating rules to determine if an operating irregularity of the conveyor belt has occurred including at least one of:
   a rip in the conveyor belt;
   belt wander of the conveyor belt; and
   edge damage of the conveyor belt.

15. The method according to claim 14, wherein the method includes, in the detection system, detecting at least one of:
   a height of material upon the conveyor belt; and
   material upon a return belt path;
   wherein detection of material is used with the one or more operating rules to determine if an operating irregularity has occurred.

16. The method according to claim 13, wherein the method includes applying the outward transverse force via at least some of the rollers having an inclined axis, thereby raising opposing edges across the width of the conveyor belt.

17. The method according to claim 13, wherein the method includes providing rollers including:
   a base roller having an axis substantially parallel with a substantially horizontal support surface;
   a first side roller having an axis which is inclined relative to the base roller for raising a corresponding first edge of the portion of the conveyor belt; and
   a second side roller having an axis which is inclined relative to the base roller and opposing inclined relative to the first side roller for raising a corresponding second and opposing edge of the portion of the conveyor belt.

18. The method according to claim 13, wherein the method includes, in the detection system, steps of:
   sensing operation of the conveyor belt using at least one sensor; and
   determining, using a processing system coupled to the at least one sensor, if an operating irregularity has occurred for the conveyor belt.

19. The method according to claim 13, wherein the method includes, in the processing system, steps of:
   receiving an indication of the operation of the conveyor belt from the at least one sensor;
   using the one or more operating rules by comparing a variable to a threshold, the variable being at least partially based on the indication; and
   determining the presence, absence or degree of an operating irregularity in accordance with the results of the comparison.

20. The method according to claim 13, wherein, in response to determining an operating irregularity, the method includes, in the processing system, at least one of:
   generating an alert; and
   stopping the conveyor belt.

21. The method according to claim 13, wherein the method includes, sensing, using at least two sensors positioned adjacent the edges of the belt, the transverse displacement of each belt edge, wherein the transverse displacement is indicative of a distance between a respective belt edge and a respective sensor.

22. The method according to claim 13, wherein the method includes using at least one ultrasonic sensor to detect the transverse displacement of the belt edges.

23. The method according to claim 13, wherein the method includes using at least one belt return path sensor for detecting material on a belt return path.

24. The method according to claim 13, wherein the method includes detecting a height of the material upon the conveyor belt using at least one material height sensor.

25. An apparatus for monitoring operation of a conveyor belt, wherein the apparatus includes:
   rollers including angularly offset rollers supporting a conveyor belt, wherein the angularly offset rollers have an axis which are angularly offset relative to a transport direction of the conveyor belt for applying an outward transverse force toward opposing edges of a portion of the conveyor belt travelling past the detection system; and
   a detection system configured to detect transverse displacement of each edge of the portion of the conveyor belt as the conveyor belt travels past the detection system, wherein the transverse displacement is indicative of an operating irregularity.

26. A method for monitoring operation of a conveyor belt, wherein the method includes:

applying an outward transverse force toward opposing edges of a portion of the conveyor belt travelling past the detection system via rollers including angularly offset rollers supporting the conveyor belt, wherein the angularly offset rollers have an axis which are angularly offset relative to a transport direction of the conveyor belt; and detecting, in a detection system, transverse displacement of each edge of a portion of the conveyor belt as the conveyor belt travels past the detection system, the transverse displacement is indicative of an operating irregularity.

\* \* \* \* \*